April 7, 1964
A. REISMAN
3,127,854
OVEN CONVEYOR SYSTEM
Filed July 12, 1961
2 Sheets-Sheet 1
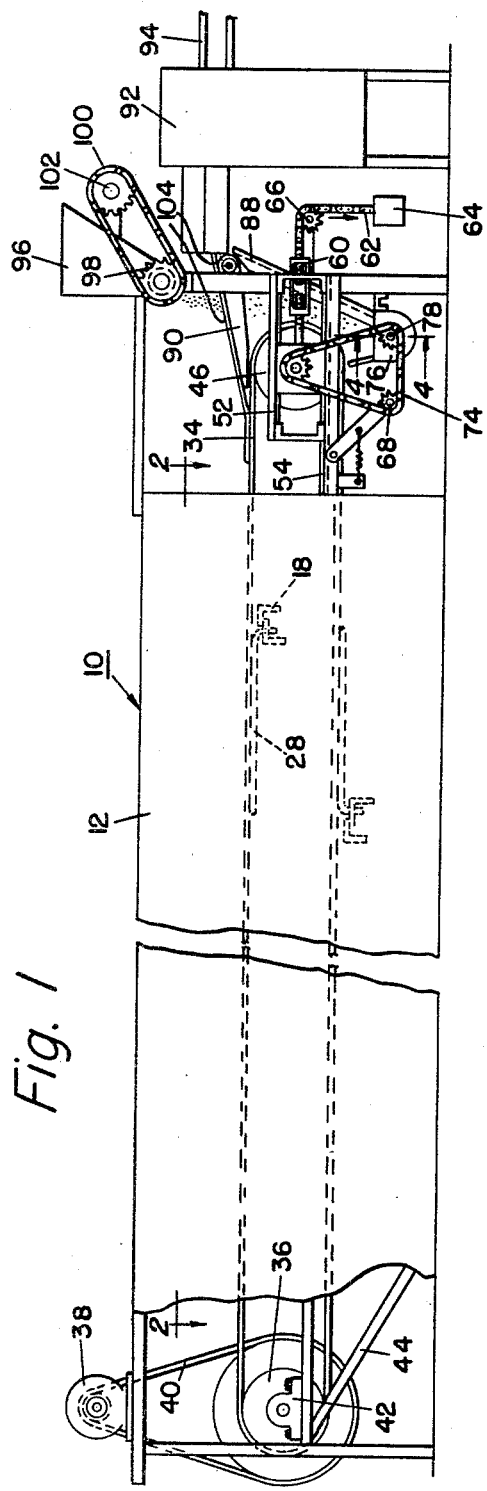
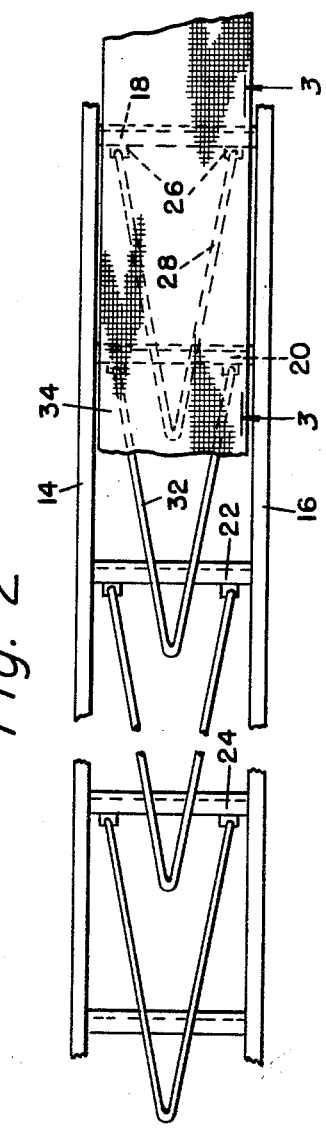
INVENTOR.
ALBERT REISMAN
BY *Arthur H. Seidel*
ATTORNEY April 7, 1964   A. REISMAN   3,127,854
OVEN CONVEYOR SYSTEM
Filed July 12, 1961   2 Sheets-Sheet 2

INVENTOR.
ALBERT REISMAN
BY
Arthur H. Seidel
ATTORNEY

3,127,854
OVEN CONVEYOR SYSTEM
Albert Reisman, Philadelphia, Pa., assignor to J. Reisman & Sons, Inc., Pennsauken, N.J., a corporation of Pennsylvania
Filed July 12, 1961, Ser. No. 123,510
1 Claim. (Cl. 107—57)

This invention relates to an oven conveyor system, and more particularly, to a conveyor system for use in the manufacture of products which must be processed through an elongated oven.

This invention is particularly adapted for making straight type pretzels. Straight type pretzels are conveyed through an oven which is approximately one hundred feet long. The oven must be kept at elevated temperatures and must be in a heated condition twenty-four hours a day. An oven of such length requires the conveyor belt to be supported with a plurality of idlers rotatably mounted at spaced points along the length of the oven. When the oven is operated twenty-four hours a day, the heat of the oven creates a difficult lubrication problem for the idlers. The present invention solves this problem by providing a support for the conveyor belt which does not require lubrication while at the same time maintaining the belt in proper alignment so as to prevent creeping or side walking. That is, long conveyor belts tend to creep toward one end of the rollers supporting the same. The present invention prevents such side walking and includes a novel roller adjusting mechanism structurally interrelated with a worm screw return device of a salt feeding mechanism. The salt feeding mechanism continuously feeds salt on the elongated pretzels as they pass between the salt hopper and the return device for salt which did not adhere to pretzels.

It is an object of this invention to provide a novel conveyor belt system for use with ovens.

It is another object of the present invention to provide a novel support for the belt of an elongated conveyor system.

It is another object of the present invention to provide a novel conveyor belt system having belt supports which do not require lubrication.

It is still another object of the present invention to provide a novel conveyor belt system having belt supports which do not require lubrication while at the same time preventing side walking of the belt.

It is a further object of the present invention to provide a novel roller adjusting mechanism for a conveyor system.

It is a further object of the present invention to provide a novel roller adjusting mechanism structurally interrelated with a salt feeding and return mechanism.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a partial elevational view of the conveyor system of the present invention shown in conjunction with an elongated oven.

FIGURE 2 is a partial sectional view taken along the lines 2—2 in FIGURE 1.

Referring to the drawing in detail, wherein like numerals indicate like elements, there is shown an oven conveyor system designated generally as 10.

Figure 3:
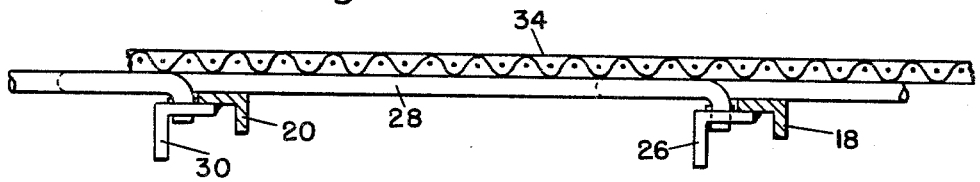
FIGURE 3 is a partial sectional view taken along the lines 3—3 in FIGURE 2.
Figure 4:
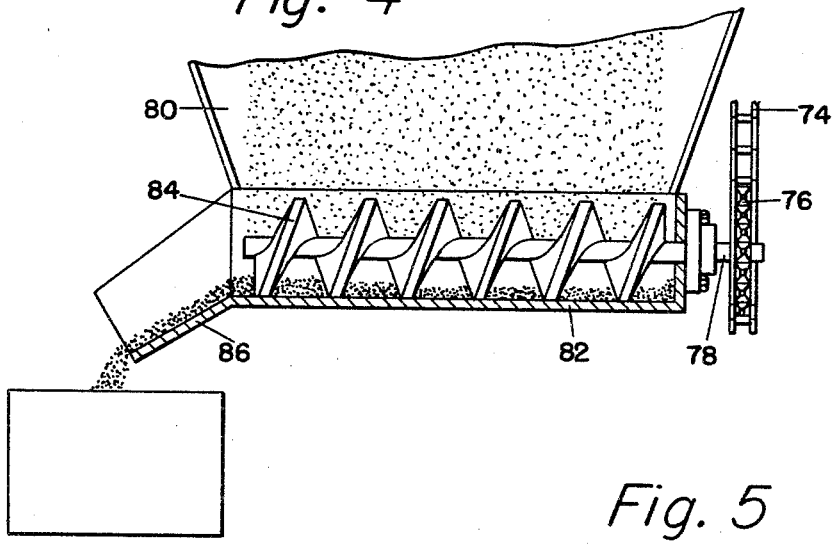
FIGURE 4 is a partial sectional view taken along the lines 4—4 in FIGURE 1.

The oven conveyor system 10 includes an oven housing 12 having side walls 14 and 16. The oven housing 12 is made from refractory brick or the like and has a length of approximately one hundred feet. Means (not shown) are provided in the oven housing 12 for heating the same. Also, means (not shown) are provided for maintaining the temperature in the oven housing 12 within a pre-described range.

Angle iron beams 18, 20, 22, and 24 extend between and are supported by the side walls 14 and 16. It will be appreciated that a greater or lesser number of such beams may be required. For example, in the oven of the present invention approximately fifteen of such beams are utilized.

A support block 26 is fixedly secured to each end of the beam 18 in any convenient manner such as by welding. The blocks 26 are provided with a hole extending therethrough.

A V-shaped support member 28 is provided to support a portion of the conveyor belt. As shown more clearly in FIGURE 2, the V-shaped member 28 is longer than the distance between the beams 18 and 20. As shown more clearly in FIGURE 3, the free ends of the V-shaped member 28 are disposed within the hole in the blocks 26. The apex of the V-shaped member 28 is substantially equidistant from the side walls 14 and 16 so as to lie along the center line of the conveyor belt.

A V-shaped member 32, identical with member 28, is supported by a support block 30 fixedly secured to the beam 20. The apex of the V-shaped member 32 extends beyond the beam 22. Since the apex of the V-shaped member 28 extends beyond beam 20, there is a range of overlapping between the V-shaped members 28 and 32. Since the apex of the V-shaped members 28 and 32 lie along a line which substantially coincides with the longitudinal axis of the belt 34, side walking or creeping of the belt 34 toward the side walls 14 or 16 is eliminated. In order that the heat within the oven housing 12 may be transmitted to the material carried by the belt 34, the belt 34 is made from a wire mesh material. It will be noted that substantially the full width of the belt 34 is in sliding engagement with the V-shaped members 28 and 32. Accordingly, wear of the belt in a narrow range is eliminated.

The belt 34 is an endless belt which extends around a driving roller 36. The roller 36 is driven by a motor 38 with an endless belt 40 extending therebetween. The free ends of the axle for the roller 36 are supported by bearings 42 (only one is shown) supported on a rigid frame support 44. In order that these elements may be illustrated, the side wall 16 of the oven housing 12 has been broken away in FIGURE 1.

The belt 34 extends around a driving roller 46 which is mounted on an axle 48. The axle 48 is supported by adjustable bearing blocks 50 as shown more clearly in FIGURE 5. The bearing block 50 at each end of the roller 46 extends between horizontally disposed frame support plates 52 and 54. The upper and lower edges of the blocks 50 are provided with longitudinally extending grooves receiving ribs on the frame support plates 52 and 54. For example, the plate 54 is provided with a rib 56 which is disposed within a groove on the lower surface of the bearing block 50.

Figure 5:
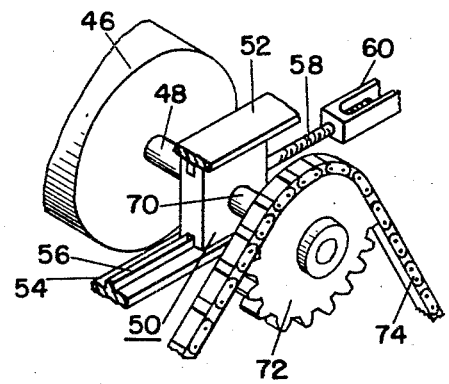
FIGURE 5 is an enlarged partial perspective view of the bearing for the driven roller in FIGURE 1.

An externally threaded bolt 58 is fixedly secured to the bearing block 50 and extends therefrom as shown more clearly in FIGURES 1 and 5. A turnbuckle 60 is threadedly engaged with one end of the bolt 58. The other end of the turnbuckle 60 is threadedly engaged with a rod fixedly secured to one end of a chain 62. The chain 62 is connected to a weight 64 and extends around a rotatably mounted sprocket 66.

The axle 48 is provided with an extension 70 which extends beyond the bearing block 50. A sprocket 72 is fixedly secured to the extension 70. A chain 74 is meshingly engaged with the sprocket 72 and a sprocket 76 on an axle 78. The chain 74 also extends around a spring biased idler sprocket 68.

The axle 78 extends through the lower portion of a housing 80 adjacent to the bottom wall 82. A worm screw 84 is secured to the outer periphery of the axle 78 and extends for substantially the full length of the bottom wall 82 to a discharge chute 86.

As shown more clearly in FIGURE 1, the housing 80 is provided with a deflection wall 88 which extends upwardly to one end of a conveyor belt 90. The conveyor belt 90 extends between a steam housing 92 and the conveyor belt 34. The material to be conveyed through the oven housing 12 is delivered to the steam housing 92 by the conveyor belt 94.

A salt hopper 96 is mounted in a plane above the plane of the conveyor belt 90. A cylinder extends across the full width of the bottom of the salt hopper 96. The cylinder is provided with a plurality of spaced longitudinally extending grooves on its outer peripheral surface. Salt is continuously fed to the grooves on the cylinder. The cylinder is rotatably mounted on an axle below the hopper 96.

The cylinder axle is provided with a sprocket 98 at one end thereof. The sprocket 98 is rotatably driven by a sprocket 102 fixedly secured to the output shaft on a motor. A chain 100 drivingly interconnects the sprockets 98 and 102.

The present invention is utilized in the following manner:

It will be assumed that the motor 38 is running, the oven housing 12 is provided with an elevated temperature, the sprocket 102 is being rotatably driven, and that material such as raw unsalted pretzels are being conveyed to the steam housing 92 by the conveyor belt 94. As the pretzel 104 exits from the steam housing 92, it passes beneath the cylinder of the salt hopper 96. Salt is continuously being dropped by such cylinder across the full width of the conveyor belt 90. The salt readily adheres to the wet pretzels 104. Salt which does not adhere to the pretzels 104 falls through the conveyor belt 90 into the housing 80.

The pretzels 104 are transferred to the conveyor belt 34 and are conveyed thereby through the oven housing 12. The pretzels 104 are of continuous length and extend from the extruder (not shown) to the end of the housing 12 adjacent to the driving roller 36 where they are cut into small pieces. As the pretzels 104 pass through the oven housing 12, all moisture therein is withdrawn by the elevated temperature within the oven housing 12.

Salt which collects within the housing 80 is fed through the outlet chute 86 by the worm screw 84. A container is provided below the chute 86 to receive such salt which may be returned to the salt hopper 96.

The V-shaped members which support the belt 34 do not require lubrication and are provided below the upper and lower portions of the belt 34 as shown in phantom in FIGURE 1. The V-shaped members supporting the belt 34 prevent side walking of the belt 34. In order to properly align the belt 34, the driven roller 46 is provided with adjustable bearing blocks 50. The tension on the belt 34 is maintained by the weight 64 which is connected to each bearing block 50 by a chain 62. The worm screw 84 utilizes the rotary motion of the driven roller 46 thereby eliminating the necessity for a separate motor.

The oven conveyor system of the present invention is a continuous system which is completely automatic. The only manual labor required is the labor required to package the pretzels as they discharge from the oven housing 12. Otherwise, the oven conveyor system 10 of the present invention continuously manufactures pretzels twenty-four hours a day. The novel manner in which the belt 34 is supported eliminates the necessity for lubrication maintenance which presented a problem due to the fact that the elevated temperature of the oven housing 12 caused the lubricant to become baked.

The present invention may be embodied in other specific forms without departing from the spirit or essential attributes thereof and, accordingly, reference should be made to the appended claim, rather than to the foregoing specification as indicating the scope of the invention.

I claim:

A conveyor system comprising an oven housing, an endless belt disposed about rollers in said housing, means driving said rollers, a plurality of spaced parallel support means extending transversely of said belt, a plurality of V-shaped support members each having an apex and two outer ends, the outer ends of each V-shaped member being secured to the ends of a respective support means, the apex of each of said support members being substantially equidistant from the side edges of said belt, the apex of each support member extending over and being supported by the support means secured to the next adjacent support member, all of said support members extending in the direction of travel of the portion of said belt supported thereby, and means for biasing one of said rollers to tension said belt.

References Cited in the file of this patent
UNITED STATES PATENTS

| | | |
|---|---|---|
| 1,011,251 | Sargent | Dec. 12, 1911 |
| 1,801,572 | Salerno | Apr. 21, 1931 |
| 2,092,836 | Engels et al. | Sept. 14, 1937 |
| 2,681,017 | Boal | June 15, 1954 |